(12) United States Patent
Kim

(10) Patent No.: US 12,029,295 B2
(45) Date of Patent: Jul. 9, 2024

(54) SAFETY CARRIER HAVING LIGHT-EMITTING DEVICE

(71) Applicant: Jong Jin Kim, Cheongju-si (KR)

(72) Inventor: Jong Jin Kim, Cheongju-si (KR)

( * ) Notice: Subject to any disclaimer, the term of this patent is extended or adjusted under 35 U.S.C. 154(b) by 0 days.

(21) Appl. No.: 18/273,800

(22) PCT Filed: Mar. 8, 2022

(86) PCT No.: PCT/KR2022/003236
§ 371 (c)(1),
(2) Date: Jul. 24, 2023

(87) PCT Pub. No.: WO2022/220406
PCT Pub. Date: Oct. 20, 2022

(65) Prior Publication Data
US 2024/0081502 A1 Mar. 14, 2024

(30) Foreign Application Priority Data

Apr. 15, 2021 (KR) .................. 10-2021-0048943

(51) Int. Cl.
*A45C 15/06* (2006.01)
*A45C 5/14* (2006.01)
(Continued)

(52) U.S. Cl.
CPC .............. *A45C 15/06* (2013.01); *A45C 5/14* (2013.01); *F21S 10/023* (2013.01); *F21V 15/01* (2013.01); *F21V 31/005* (2013.01)

(58) Field of Classification Search
CPC .......... A45C 15/06; A45C 5/14; F21S 10/023; F21V 15/01; F21V 31/005
See application file for complete search history.

(56) References Cited

U.S. PATENT DOCUMENTS

| 8,434,577 B1 * | 5/2013 | Al-Qaffas | A45C 5/14 |
| | | | 280/79.2 |
| 2004/0084880 A1 * | 5/2004 | Kim | B62B 9/005 |
| | | | 280/47.24 |

(Continued)

FOREIGN PATENT DOCUMENTS

| KR | 10-0819174 B1 | 4/2008 |
| KR | 10-2016-0095506 A | 8/2016 |

(Continued)

OTHER PUBLICATIONS

International Search Report for PCT/KR2022/003236 mailed Jun. 22, 2022 from Korean Intellectual Property Office.

*Primary Examiner* — Tsion Tumebo
(74) *Attorney, Agent, or Firm* — Revolution IP, PLLC

(57) ABSTRACT

A safety carrier includes a body (100) in which a storage space is formed, a communication unit (110) which is accommodated in the body (100) and receives a control signal from an external terminal device (200), a sensing unit (120) which detects a front surface and a rear surface of the body (100) based on a direction in which the body (100) lies, a control unit (130) which performs control so that a color, a blinking method, a state, and the like of a display unit (140) positioned to be exposed at an outer surface of the body (100) are displayed on the front surface detected by the sensing unit (120) based on the control signal input to the communication unit (110), and a battery unit (150) accommodated in the body (100) and electrically connected to the display unit (140).

5 Claims, 3 Drawing Sheets

(51) Int. Cl.
*F21S 10/02* (2006.01)
*F21V 15/01* (2006.01)
*F21V 31/00* (2006.01)

(56) References Cited

U.S. PATENT DOCUMENTS

| | | | | |
|---|---|---|---|---|
| 2005/0068761 | A1* | 3/2005 | Chien | A43B 3/36 |
| | | | | 362/189 |
| 2007/0131462 | A1* | 6/2007 | Hemsley | A45C 5/14 |
| | | | | 180/19.3 |
| 2009/0201671 | A1* | 8/2009 | Huntley | A45C 15/06 |
| | | | | 362/108 |
| 2014/0107868 | A1* | 4/2014 | DiGiacomcantonio | A45C 5/14 |
| | | | | 701/2 |
| 2016/0226547 | A1 | 8/2016 | Choi | |
| 2017/0188679 | A1* | 7/2017 | Jacob | A45C 13/10 |
| 2017/0220040 | A1* | 8/2017 | London | A45C 9/00 |
| 2017/0367452 | A1* | 12/2017 | Barron | G01S 5/02 |
| 2018/0116361 | A1* | 5/2018 | Anjum | A45C 5/146 |
| 2018/0330581 | A1* | 11/2018 | Latief | A45C 13/24 |
| 2018/0360177 | A1* | 12/2018 | Kovtun | G05D 1/0255 |

FOREIGN PATENT DOCUMENTS

| | | |
|---|---|---|
| KR | 10-1948283 B1 | 2/2019 |
| KR | 10-2007720 B1 | 8/2019 |
| KR | 10-2194493 B1 | 12/2020 |

* cited by examiner

SAFETY CARRIER HAVING LIGHT-EMITTING DEVICE

TECHNICAL FIELD

The present invention relates to a travel carrier and a mini hard carrier, and more particularly, to a safety carrier which emits light to the outside of a travel carrier or mini-hard carrier and emits a warning sound in the case of an emergency.

BACKGROUND ART

A carrier is referred to as a bag used for traveling, includes a frame with a framework structure and a hard case, that is, a trunk, formed of an impact-resistance material to maintain a shape of the carrier at an event of an external impact, and is advantageous for safely carrying items during travel.

Such a carrier is typically provided with an outer surface of the frame formed of a metal such as aluminum or a synthetic resin such as poly-ethylene (PE), an outer skin formed of cloth, leather, or a synthetic leather is applied on an outer surface of the carrier so that the carrier is formed in substantially a hexagonal box shape, and an inlet which may be opened or closed using a zipper or the like is provided in one surface thereof.

For example, a carrier is provided with a telescopic handle on one side and wheels on the other side to improve convenient mobility and is widely used for long-distance travel using transportation such as an aircraft or train as well as short-distance travel.

In particular, in the case of a travel by flying aircraft, the carrier is checked as baggage of an aircraft at a point of departure and sent to a destination, and at the destination, the carrier which has been checked as baggage is transferred by a conveyor belt, and a traveler may find and take the carrier.

Accordingly, an airport has a structure in which a conveyor belt which continuously transfers baggage to allow travelers to find their baggage are installed, and the travelers visually identify and find their carriers among many carriers being transferred by the conveyer belts.

However, in recent years, a demand for carriers has been dramatically increasing as mid- to long-term traveling has increased, and thus there are more carriers with the same or similar colors and shapes on a conveyor belt. Accordingly, it is not easy for travelers to find their carriers at once on the conveyer belt on which many of the same or similar carries are moving together.

In order to solve such as a problem, various identification tags (nametags) are attached to baggage, or communication chips capable of near field communication are embedded in baggage to communicate with traveler's smartphone, and thus travelers more easily identify and find their baggage.

However, even when an identification tag is attached to a carrier, it is not enough to quickly find the carrier only using a tag when many similar carriers are moving on the conveyor belt.

In addition, a smartphone may be used to confirm that a traveler's carrier has moved to a close position on a conveyor belt, but, even in this case, there is a problem that it is difficult to find the traveler's carrier at once on the conveyor belt on which many of the same or similar carriers are moving together.

Technical Problem

The present invention is directed to providing a safety carrier having a light-emitting device which allows the carrier to be found using light emission of a light-emitting diode (LED) or optical fiber on an outer portion of the carrier and a sound (such as a beep sound) emitted from a speaker.

The present invention is directed to providing a safety carrier having a light-emitting device which emits light from a front surface of the carrier so that the carrier being moved by a conveyor belt is easily found regardless of a direction in which the carrier is loaded.

The present invention is directed to providing a safety carrier having a light-emitting device which operates in conjunction with a user device, such as, a separate wireless remote control, smartphone, or tablet, through wireless communication to control light emission of an LED or optical fiber of the carrier.

The present invention is directed to providing a safety carrier having a light-emitting device which controls changes in color, a blinking method, and a state of light emitted from a front surface of an LED or optical fiber, and sound emitted from a speaker.

The present invention is directed to providing a safety carrier having a light-emitting device provided in a front surface or a rear surface of the carrier and embedded at a predetermined depth from the surface of the carrier surface to be protected from an external impact.

The present invention is directed to providing a safety carrier having a light-emitting device which provides light emission of an LED, optical fiber, or flashlight to a front surface or a rear surface of the carrier to serve a function of a safety lamp to the front surface or the rear surface while walking at night or in bad weather and includes an acoustic device which generates a warning sound in the case of an emergency to prepare for an accident.

Objectives of the present invention are not limited to the above-described objectives, and other objectives and advantages of the present invention that are not described may be understood from the following descriptions and clearly understood from embodiments of the present invention. In addition, it may be seen that the objectives and the advantages of the present invention may be realized using elements described in the appended claims and combinations thereof.

Technical Solution

One aspect of the present invention provides a safety carrier having a light-emitting device, wherein the safety carrier includes a body (100) in which a storage space is formed, a communication unit (110) which is accommodated in the body (100) and receives a control signal from an external terminal device (200), a sensing unit (120) which detects a front surface and a rear surface of the body (100) based on a direction in which the body (100) lies, a control unit (130) which performs control so that a color, a blinking method, a state, and the like of a display unit (140) positioned to be exposed at an outer surface of the body (100) are displayed on the front surface detected by the sensing unit (120) based on the control signal input to the communication unit (110), and a battery unit (150) accommodated in the body (100) and electrically connected to the display unit (140) and the communication unit (110) to provide power to the display unit (140) and the communication unit (110).

The control unit (130) may perform control so that turned on and off periods, an illuminance of lighting, and a color of lighting of the display unit (140) are changed and only the display unit (140) provided on the front surface detected by the sensing unit (120) is turned on and off.

The display unit (140) may include one or more display lamps (light-emitting diodes (LEDs) or optical fibers, 141) each provided to be embedded at a predetermined depth from a surface of a body portion (101) and configured to simultaneously or sequentially emit light with one or more colors and a sealing part (142) including a transparent plate which transmits light emitted by the display lamp (141) to an outside and is positioned on the display lamp (141) in a direction in which the display lamp (141) emits light to seal the display lamp (141) from the outside so as to protect the display lamp (141) from an external impact and moisture.

The display unit (140) may provide at least one function among a traffic safety lamp function for protecting a pedestrian from a vehicle approaching from behind when provided on the rear surface of the body (100), a safety lamp function for illuminating an area around feet of the walking pedestrian when provided on the front surface of the body (100), and a decorating function for designing emitted light using at least one of different colors, shapes, and blinking methods according to personality of each user when provided on an outer surface of the body (100).

The safety carrier may further include a switch (105) which is provided on one side of a sliding type handle (103) of the body (100) to generate at least one of any one emergency warning sound among a siren sound, a beep sound, and a sound prestored in a memory and a blinking of the entire display unit (140).

Advantageous Effects

A safety carrier having a light-emitting device according to the present invention has the following effects.

First, a traveler's carrier can be easily found through light emission of a light-emitting diode (LED) or optical fiber on an outer portion of the carrier and a memorized speaker sound, and in particular, light of the LED or optical fiber is emitted from a front surface of the carrier so that the carrier being moved by a conveyer belt can be more easily found regardless of a direction in which the carrier is loaded.

Second, light emission of an LED or optical fiber can be controlled in conjunction with a user device such as a smartphone or tablet, as well as a separate wireless remote controller through wireless communication to provide convenience in controlling a light-emitting device provided in a carrier.

Third, a color, a blinking method, and a state of light emitted by an LED or optical fiber in a front surface of a carrier can be changed and thus can be used for various functions such as mutual identification, security, and theft alarm.

Fourth, since light-emitting devices provided in a front surface and a rear surface of a carrier are each embedded at a predetermined depth from the surface of the carrier surface, breakage and failure of the light-emitting devices due to an external impact from the outside of the carrier can be prevented.

Fifth, a front surface and a rear surface of a carrier can provide light emission of an LED, optical fiber, or flashlight to serve as a function of a safety lamp to the front surface or the rear surface during walking at night or in bad weather, and an acoustic device which generates a warning sound in the case of an emergency can be provided to prepare for an accident.

Specific effects, as well as the above-described effects, of the present invention will be described below through a detailed description for implementing the invention.

MODES OF THE INVENTION

Figure 1:
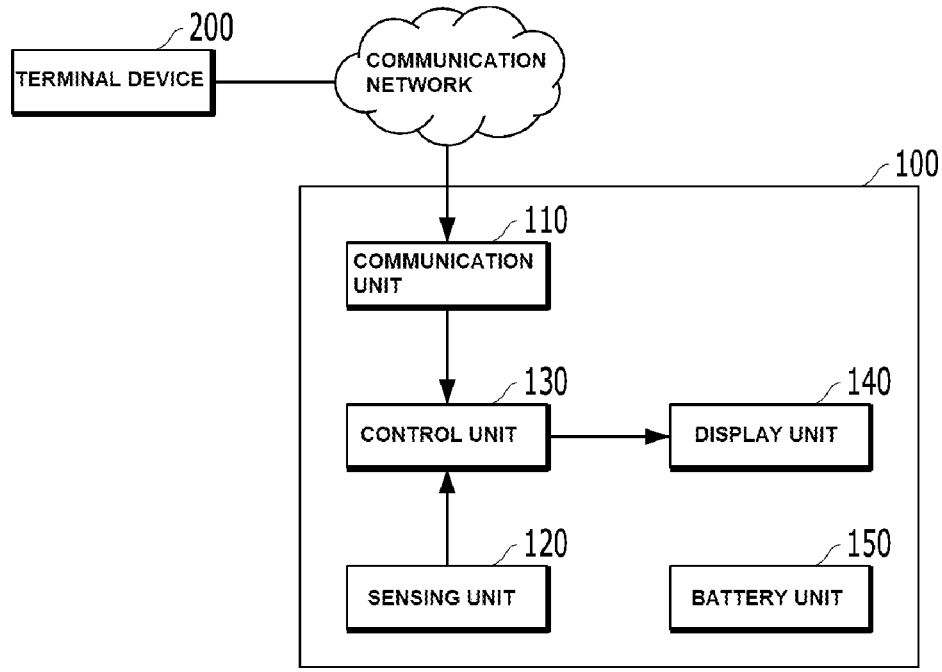
FIG. 1 is a block diagram illustrating a configuration of a safety carrier having a light-emitting device according to an embodiment of the present invention.

Other objectives, features, and advantages of the present invention will be apparent from detailed descriptions of embodiments with reference to the accompanying drawings.

Although terms used herein are selected from among general terms that are currently and widely used in consideration of functions of the present invention, these may be changed according to intentions of those skilled in the art, precedents, or the advent of new technology. In addition, in a specific case, some terms may be arbitrary selected by applicants. In this case, meanings thereof will be described in detail in a corresponding description of the present invention. Therefore, the terms used herein should be defined based on meanings of the terms and content of this entire specification, rather than simply the terms themselves.

Exemplary embodiments of a safety carrier having a light-emitting device according to the present invention will be described below with reference to the accompanying drawings. However, the present invention is not limited to embodiments to be disclosed below and may be variously changed and implemented in various different forms. The embodiments are only provided in order to fully explain the present invention and fully explain the scope of the present invention to those skilled in the art. Therefore, since the embodiments described in this specification and components illustrated in the drawings are only exemplary embodiments and do not represent the overall technological scope of the invention, it should be understood that there may be various equivalents or modifications substituting the exemplary embodiments at the time of filing of this application.

Hereinafter, a case in which an arbitrary element is disposed "over (or under)" or "above (or below)" an element may include a case in which the arbitrary element is disposed in contact with an upper (or lower) surface of the element or a case in which still another element is interposed between the element and the arbitrary element disposed over (or under) the element.

It should be understood that, when a first element is referred to as being "connected," "coupled," or "bonded" to a second element, the first element may be directly connected or bonded to the second element, a third element may be interposed therebetween, or the elements may be connected, coupled, or bonded through other elements.

Figure 2:
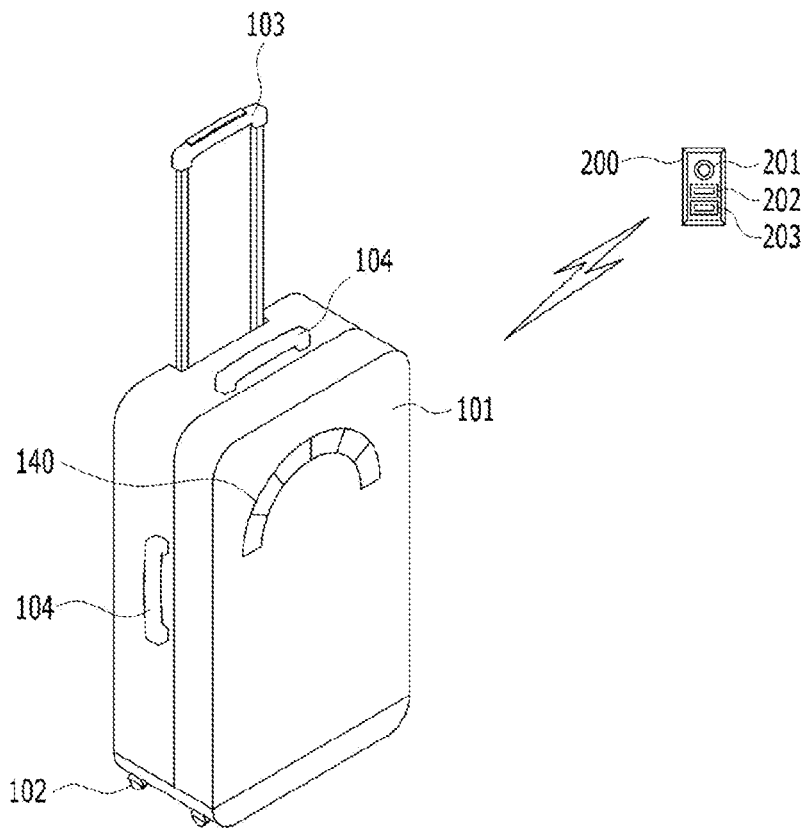
FIG. 2 is a perspective view illustrating the safety carrier having a light-emitting device according to the embodiment of the present invention.

FIG. 1 is a block diagram illustrating a configuration of a safety carrier having a light-emitting device according to an embodiment of the present invention, and FIG. 2 is a perspective view illustrating the safety carrier having a light-emitting device according to the embodiment of the present invention. In this case, the safety carrier having the light-emitting device illustrated in FIGS. 1 and 2 is in accordance with one embodiment, and components of the safety carrier are not limited to the embodiment illustrated in FIGS. 1 and 2, and some components may be added, changed, or deleted as necessary.

As illustrated in FIGS. 1 and 2, the safety carrier of the present invention may include a body 100 in which storage space is formed, a communication unit 110 which is accommodated in the body 100 and receives a control signal from an external terminal device 200, a sensing unit 120 which detects a front surface and a rear surface of the body 100 based on a direction in which the body 100 lies, and a control unit 130 which performs control so that a color, a blinking method, a state, and the like of a display unit 140 positioned to be exposed at an outer surface of the body 100 are displayed on the front surface detected by the sensing unit 120 based on a control signal input to the communication unit 110. In addition, the safety carrier may further include a battery unit 150 accommodated in the body 100 and electrically connected to the display unit 140 and the communication unit 110 to provide power to the display unit 140 and the communication unit 110.

In this case, the safety carrier may include both a travel carrier and a mini-hard carrier. The battery unit 150 is a battery compliant to an air transportation regulation, such as an alkaline battery, and is attachable to and detachable from the safety carrier. In addition, when the carrier is not used as an air cargo, and the battery unit 150 is used for a traffic safety lamp, flashlight, or decorative function, the battery unit 150 may include a battery, such as a lithium-ion battery, to be used as a power source. In addition, the battery unit 150 may be connected to an external power source to be charged using a charging cable.

The body 100 may include a pair of housings 101 each coupled to each other to form a storage space therebetween and having a box-shaped frame structure to maintain a shape against an external impact, a plurality of moving wheels 102 which are provided on a bottom surface of the housing 101 and rotated by friction with the ground, a sliding type handle 103 fixed to any one upright surface of the housing 101 to be slid in a vertical direction, and pivoting type handles 104 pivotably mounted on an upper portion of the housing 101.

The communication unit 110 receives a control signal transmitted from the external terminal device 200 through a communication network. In this case, the communication unit 110 in an inactive state may be automatically activated when the carrier approaches a predetermined range and thus communicate with the external terminal device 200.

In this case, the communication unit 110 may include various communication modules, such as a wireless Internet module, a near field communication module, a mobile communication module, and the like. The wireless Internet module is a module which is connected to an external network and performs communication according to a communication protocol such as wireless local area network (WLAN), Wi-Fi, Wireless broadband (WiBro), world interoperability for microwave access (WiMAX), high speed downlink packet access (HSDPA), or the like. The near field communication module is a module for performing communication with an external device positioned at a short distance according to a near field communication method such as Bluetooth, radio frequency identification (RFID), infrared data association (IrDA), ultra-wideband (UWB), ZigBee, or the like. The mobile communication module is a module which is connected to a mobile communication network and performs communication according to various mobile communication standards such as $3^{rd}$ generation (3G), $3^{rd}$ Generation Partnership Project (3GPP), long term evolution (LTE), or the like. However, the present invention is not limited thereto, and the communication unit 110 may employ communication modules other than the above-described modules as long as performing communication with the user device 20 and transmitting packets or information contained in packets to the user device 20.

The sensing unit 120 is a unit for detecting the front surface and the rear surface of the body 100 based on the direction in which the body 100 lies and includes a pressure sensor, an ultrasonic sensor, and the like on each of the front surface and the rear surface of the body 100. When the carrier is transferred by a conveyer belt, the sensing unit 120 may detect orientations of a bottom surface as the rear surface and a top surface as the front surface.

The control unit 130 may perform control so that turned on and off periods, an illuminance of lighting, and a color of lighting of the display unit 140, which may be preset and changed using the external terminal device 200, are changed. That is, the control unit 130 may control a light-emitting diode (LED) or optical fiber of the display unit 140 to be repeatedly turned on and off at predetermined time intervals with different colors.

In addition, the control unit 130 may control only the display unit 140 provided on the front surface detected by the sensing unit 120 to be turned on and off. Accordingly, when the carrier is transferred by the conveyer belt, light of the LED or optical fiber is emitted from the front surface of the carrier, and thus a user can more easily find the carrier regardless of a direction in which the carrier moved by the conveyer belt is loaded. In addition, an amount of power consumption of the battery unit 150 which supplies power to the display unit 140 can be reduced as the display unit 140 provided on the rear surface detected by the sensing unit 120 is not turned on and off.

The display unit 140 may include a display lamp (LED or optical fiber), which is displayed in a state of being turned on or off when a control signal is received from the control unit 130, on each of the front and rear surfaces of a body 101. In this case, since a color, a blinking method, and a state of light emitted by the LED or optical fiber may be changed according to the control signal, the display unit 140 may be used for various functions such as mutual identification, safety, security, and theft alarm.

For example, the display unit 140 may be maintained in an always on state while walking at night or in bad weather, and thus the rear surface may be used for a function of a safety pilot lamp and the front surface may be used for a function of a flashlight while walking. Accordingly, while walking at night or in bad weather, the safety pilot lamp emits light in the backward direction to alert the presence of a pedestrian to an approaching vehicle or motorcycle, the flashlight emits light in the forward direction to provide a bright view in the forward direction to reduce accidents, and thus safety can be secured at night or in bad weather.

Figure 4A:
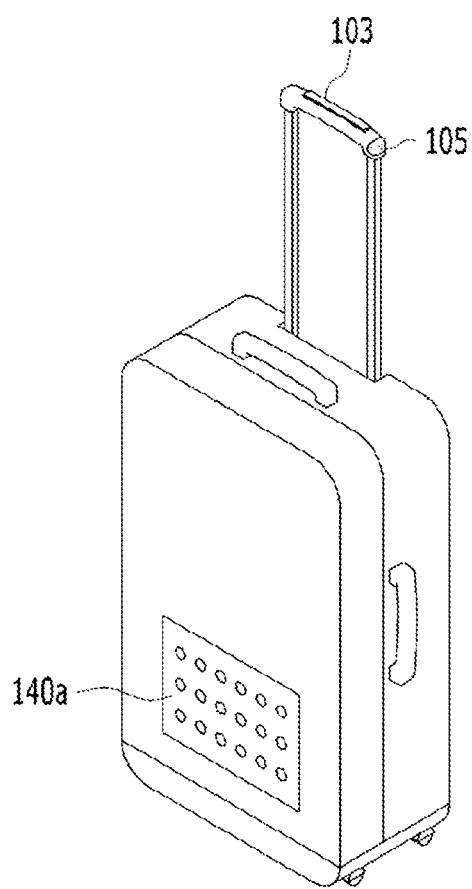
FIGS. 4A to 4C are detailed views illustrating a function of the display unit in the safety carrier of the present invention.
Figure 4B:
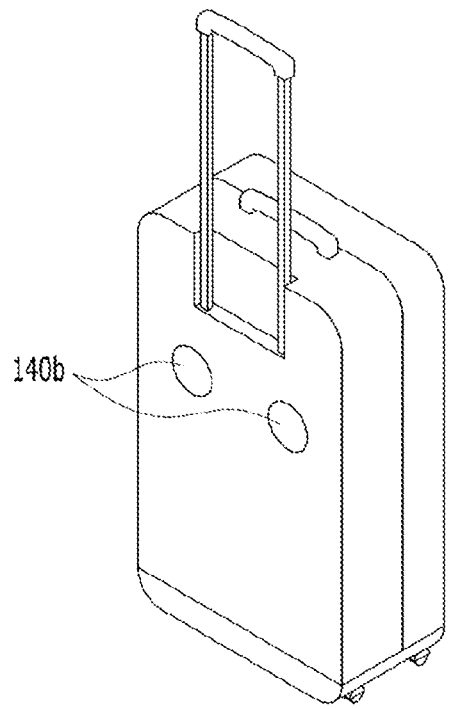
Figure 4C:
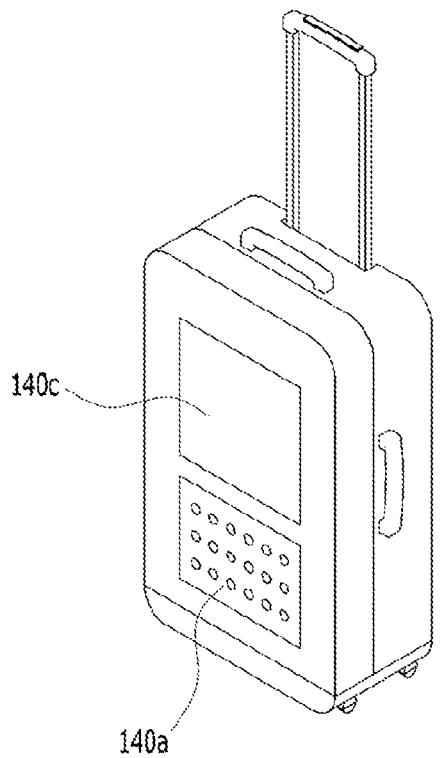

FIGS. 4A and 4C are detailed views illustrating a function of the display unit in the safety carrier of the present invention.

As illustrated in FIG. 4A, a display unit 140a provided on the rear surface (a surface opposite to a direction in which the carrier moves) of the body 100 may provide a function of identification of the carrier being moved by the conveyer belt and serve as a traffic safety lamp to alert the presence of a pedestrian in front of a vehicle approaching from behind.

In addition, as illustrated in FIG. 4B, a display unit 140b provided on the front surface (a surface in the direction in which the carrier moves) of the body 100 may provide a function of identification of the carrier being moved by the conveyer belt and serve as a safety lamp (flashlight) for illuminating an area around the feet of a pedestrian who walks in a dark area.

The functions (of the safety lamp and for an emergency warning sound) for safety, security, and theft alarm of the display unit 140 having such a structure may be used as essential functions when traveling a foreign country with poor security. For example, for the security and theft alarm, the entire display unit 140 on the front and rear surfaces may be blinked with emission of the emergency warning sound.

In this case, as an acoustic device which generates a sound may be embedded in the body 100, the emergency warning sound may be easily emitted, and the acoustic device may output a siren sound, a beep sound, or a sound prestored in a memory as the emergency warning sound.

In addition, the display unit 140 is provided so that light-emitting devices provided in the front surface and the rear surface are each embedded at a predetermined depth from the surface of the carrier to prevent breakage and failure of the carrier from an external impact.

Figure 3:
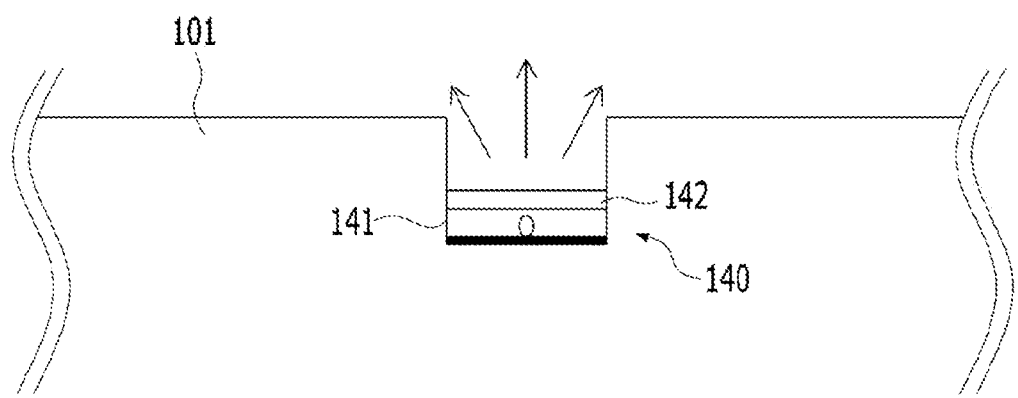
FIG. 3 is a detail view illustrating a structure of a display unit of FIG. 2.

FIG. 3 is a detail view illustrating a structure of the display unit of FIG. 2.

As illustrated in FIG. 3, the display unit 140 may include one or more display lamps (LEDs or optical fibers) 141 each provided to be embedded at a predetermined depth from a surface of a body portion 101 and capable of simultaneously or sequentially emitting light with one or more colors and a sealing part 142 including a transparent plate which transmits light emitted by the display lamp 141 to the outside and positioned on the display lamp 141 in a direction in which the display lamp 141 emits light to seal the display lamp 141 from the outside and thus protect the display lamp 141 from an external impact and moisture.

The battery unit 150 may include a rechargeable secondary battery, but is not limited thereto, and may include a detachable battery.

Meanwhile, the external terminal device 200 may include a remote controller including an input button, but is not limited thereto, and may include a personal portable terminal or a fixing switch 210, which is fixed to one side of the sliding type handle 103 of the body 100.

As illustrated in FIG. 2, in order to control functions for mutual identification, security, and theft alarm, a remote controller 200 may include an identification button 201, a safety lamp button 202, and a warning sound button 203. In this case, at least one of the safety lamp button 202 and the warning sound button 203 may further include a switch 105 on one side of the sliding type handle 103 of the body 100 as illustrated in FIG. 4A.

The remote controller may be coupled to a seating groove (not shown), which is provided in an outer side of the body 100, and normally provided to be inserted into the seating groove of the body 100. In addition, when baggage is checked at an airport, the remote controller may be separated from the seat groove so that the user may store the remote controller separately from the carrier.

The personal portable terminal may include any type of handheld-based wireless communication device, such as, a mobile phone, a smartphone, a personal digital assistant (PDA), a portable multimedia player (PMP), a tablet personal computer (PC), or the like, capable of wirelessly transmitting a control signal to the communication unit 110 through a network.

In this case, an application for providing a control signal for controlling a color, a blinking method, and a state of the display unit 140 through the communication unit 110 may be installed in the personal portable terminal. The application may be provided from other application markets (for example, Apple App Store, Google Android Market, and the like) for smartphones and installed thereon.

The application may provide an amount of residual power of the battery unit 150 through at least one of a sound, vibrations, and a display when the communication unit 110 and the communication network in an inactive state are connected in an active state.

The user may confirm that the user's baggage being transferred by the conveyor belt in the airport is positioned close to him or her by confirming connection of the communication unit 110 using the application. In this case, the user can easily find the carrier through LED light emission by generating a control signal to control the display unit 140 of the carrier to be turned on and off.

According to such a structure, the present invention allows the carrier to be easily found through light emitted by the LED or fiber optic on an outer portion of the carrier and a memorized speaker sound, and particularly, the carrier can be more easily found regardless of a direction, in which the carrier being moved by the conveyer belt is loaded, by emitting light of the LED light from the front surface of the carrier.

In addition, since accidents can be reduced using light emitted by the LED or optical fiber on the outer portion of the carrier while walking at night or in bad weather, safety during night or bad weather can be secured.

In addition, as illustrated in FIG. 4C, a display unit 140c having a decorating function may be further added to the outer surface of the body 100. The decorating function of the display unit 140c is a function which allows the user to create a special personalized fashion according to each user's personality and allows the user to design light emitted by the display unit 140c using LED, optical fiber, and various devices so as to provide various colors, shapes, blinking, and the like.

In addition, the safety carrier of the present invention may provide a global positioning system (GPS) tracking function and an electronic hand scale function as additional options.

The GPS tracking function is a function for tracking a position of the safety carrier and is performed when a GPS module is added to the safety carrier. The GPS module is detachable and may be used for multiple purposes such as hiking, camping, and fishing when the carrier is not used.

The electronic hand scale function may be performed by a scale which is capable of weighting baggage and detachable, and may be digitally embedded.

In this case, the GPS module and the electronic hand scale may be coupled to the seating groove (not shown) provided in the outer side of the body 100, provided to be inserted into the seating groove of the body 100 normally, separated from the seating groove, and stored by the user separately from the carrier.

Meanwhile, all references, including publications, patent applications, and patents, cited herein are hereby incorporated by reference to the same extent as if each reference were individually and specifically indicated to be incorporated by reference and were set forth in its entirety herein.

For the purposes of promoting understanding of the disclosed embodiments, reference numerals have been made to the embodiments illustrated in the drawings, and specific terms have been used to describe the embodiments, however, the embodiments are not limited by the specific terms. The disclosed embodiments may include any components which are generally considered by those skilled in the art.

Furthermore, the connecting lines or connecting members between components illustrated in the drawing represent exemplary of functional connection and/or physical or circuit connection, and may be replaceable, or represented as additional various functional connection, physical connection, or circuit connection. In addition, a component may not be essential to the practice of an embodiment unless the component is specifically described as "essential" or "important."

In addition, it will be understood by those skilled in the art that various modifications may be formed. Therefore, the technical scope of the present invention should be defined by the technical spirit of the appended claims.

The invention claimed is:

1. A safety carrier having a light-emitting device, comprising:
   a body (100) in which a storage space is formed;
   a communication unit (110) which is accommodated in the body (100) and receives a control signal from an external terminal device (200);
   a sensing unit (120) which detects a front surface and a rear surface of the body (100) based on a direction in which the body (100) lies;
   a display unit (140) formed at each of the front and rear surfaces of the body (100);
   a control unit (130) which performs control so that the display unit (140) to be displayed is selected based on the front surface detected by the sensing unit (120) and a color, a blinking method, a state, and the like of the selected display unit (140) positioned to be exposed at an outer surface of the body (100) are displayed on the selected display unit (140) at the front surface detected by the sensing unit (120) based on the control signal input to the communication unit (110); and
   a battery unit (150) accommodated in the body (100) and electrically connected to the display unit (140) and the communication unit (110) to provide power to the display unit (140) and the communication unit (110),
   wherein the display unit (140) includes:
   one or more display lamps (141) each provided to be embedded at a predetermined depth from a surface of a body portion (101) and configured to simultaneously or sequentially emit light with one or more colors; and
   a sealing part (142) including a transparent plate which transmits light emitted by the display lamp (141) to an outside and is positioned lower than the surface of the body portion (101) on the display lamp (141) in a direction in which the display lamp (141) emits light to seal the display lamp (141) from the outside so as to protect the display lamp (141) from an external impact and moisture.

2. The safety carrier of claim 1, wherein the control unit (130) performs control so that:
   turned on and off periods, an illuminance of lighting, and a color of lighting of the display unit (140) are changed; and
   only the display unit (140) provided on the front surface detected by the sensing unit (120) is turned on and off.

3. The safety carrier of claim 1, wherein the display unit (140) provides at least one function among:
   a traffic safety lamp function for protecting a pedestrian from a vehicle approaching from behind when provided on the rear surface of the body (100);
   a safety lamp function for illuminating an area around feet of the walking pedestrian when provided on the front surface of the body (100); and
   a decorating function for designing emitted light using at least one of different colors, shapes, and blinking methods according to personality of each user when provided on an outer surface of the body (100).

4. The safety carrier of claim 1, further comprising a switch (105) which is provided on one side of a sliding type handle (103) of the body (100) to generate at least one of any one emergency warning sound among a siren sound, a beep sound, and a sound prestored in a memory and a blinking of the entire display unit (140).

5. The safety carrier of claim 1, wherein the sensing unit is an ultrasonic sensor.

* * * * *